(12) United States Patent
Frisky et al.

(10) Patent No.: US 11,639,640 B2
(45) Date of Patent: *May 2, 2023

(54) ELECTRO-SEPARATION CELL WITH SOLIDS REMOVAL

(71) Applicant: Ground Effects Environmental Services Inc., Regina (CA)

(72) Inventors: Sean Frisky, Regina (CA); Jason Beaudin, Regina (CA); Justin Lee, Regina (CA); Joel Wolensky, Regina (CA)

(73) Assignee: Ground Effect Environmental Services, Inc., Regina (CA)

( * ) Notice: Subject to any disclaimer, the term of this patent is extended or adjusted under 35 U.S.C. 154(b) by 409 days.

This patent is subject to a terminal disclaimer.

(21) Appl. No.: 16/814,266

(22) Filed: Mar. 10, 2020

(65) Prior Publication Data

US 2020/0208477 A1 Jul. 2, 2020

Related U.S. Application Data

(63) Continuation of application No. 15/562,916, filed as application No. PCT/CA2015/000196 on Mar. 31, 2015, now Pat. No. 10,597,958.

(51) Int. Cl.
| | | |
|---|---|---|
| *E21B 21/06* | (2006.01) | |
| *B03C 5/02* | (2006.01) | |
| *B01D 17/06* | (2006.01) | |
| *C02F 1/463* | (2023.01) | |
| *B01D 21/02* | (2006.01) | |

(Continued)

(52) U.S. Cl.
CPC ............ *E21B 21/065* (2013.01); *B01D 17/06* (2013.01); *B01D 21/0006* (2013.01); *B01D 21/0009* (2013.01); *B01D 21/0045* (2013.01); *B01D 21/04* (2013.01); *B01D 21/10* (2013.01); *B01D 21/2461* (2013.01); *B03C 5/02* (2013.01); *C02F 1/463* (2013.01); *C02F 2001/46119* (2013.01); *C09K 8/32* (2013.01)

(58) Field of Classification Search
CPC ............ B01D 21/0006; B01D 21/0009; B01D 21/0045; B01D 21/2461; B03C 5/02; C02F 1/463; C02F 2001/46119; E21B 21/0009
USPC ................... 210/243, 521, 523, 748.01, 802; 204/648, 672, 673
See application file for complete search history.

(56) References Cited

U.S. PATENT DOCUMENTS

| | | | | |
|---|---|---|---|---|
| 1,458,805 A | * | 6/1923 | Christensen | ....... B01D 21/0006 210/521 |
| 2,542,054 A | | 2/1951 | Penney et al. | |

(Continued)

FOREIGN PATENT DOCUMENTS

| | | |
|---|---|---|
| CA | 2776215 A1 | 11/2013 |
| CA | 2815042 A1 | 11/2013 |

(Continued)

*Primary Examiner* — Christopher Upton
(74) *Attorney, Agent, or Firm* — Standley Law Group LLP; Beverly A. Marsh; Kenny W. Pung

(57) ABSTRACT

An electro-separation apparatus for separation of drilling fluids is provided. The apparatus can include a reaction chamber and a set of electrode plates provided in the reaction chamber. A sediment outlet can be provided near a bottom of the reaction chamber and wiper blades can be provided for sweeping sediment that has collected on the electrode plates towards the sediment outlet.

17 Claims, 12 Drawing Sheets

(51) Int. Cl.
  *B01D 21/24* (2006.01)
  *B01D 21/04* (2006.01)
  *B01D 21/00* (2006.01)
  *C09K 8/32* (2006.01)
  *C02F 1/461* (2023.01)

(56) References Cited

U.S. PATENT DOCUMENTS

| | | |
|---|---|---|
| 3,370,703 A | 2/1968 | Carpenter |
| 6,179,991 B1 | 1/2001 | Norris et al. |
| 6,736,970 B1 * | 5/2004 | Kivisto .................. C25C 7/06 |
| | | 210/243 |
| 9,102,554 B2 | 8/2015 | Robinson |
| 9,221,063 B2 | 12/2015 | Frisky et al. |
| 10,597,958 B2 * | 3/2020 | Frisky .................. C02F 1/463 |
| 2008/0223731 A1 | 9/2008 | Lee |
| 2011/0017610 A1 | 1/2011 | Hahn et al. |
| 2011/0192730 A1 | 8/2011 | Bjornen |
| 2011/0199423 A1 | 8/2011 | Shimazaki |
| 2011/0233144 A1 | 9/2011 | McCabe |
| 2013/0180857 A1 | 7/2013 | Heffernan et al. |

FOREIGN PATENT DOCUMENTS

| | | |
|---|---|---|
| WO | 8901189 A1 | 2/1989 |
| WO | WO 95/24253 * | 9/1995 |
| WO | 2012151617 A1 | 11/2012 |

* cited by examiner

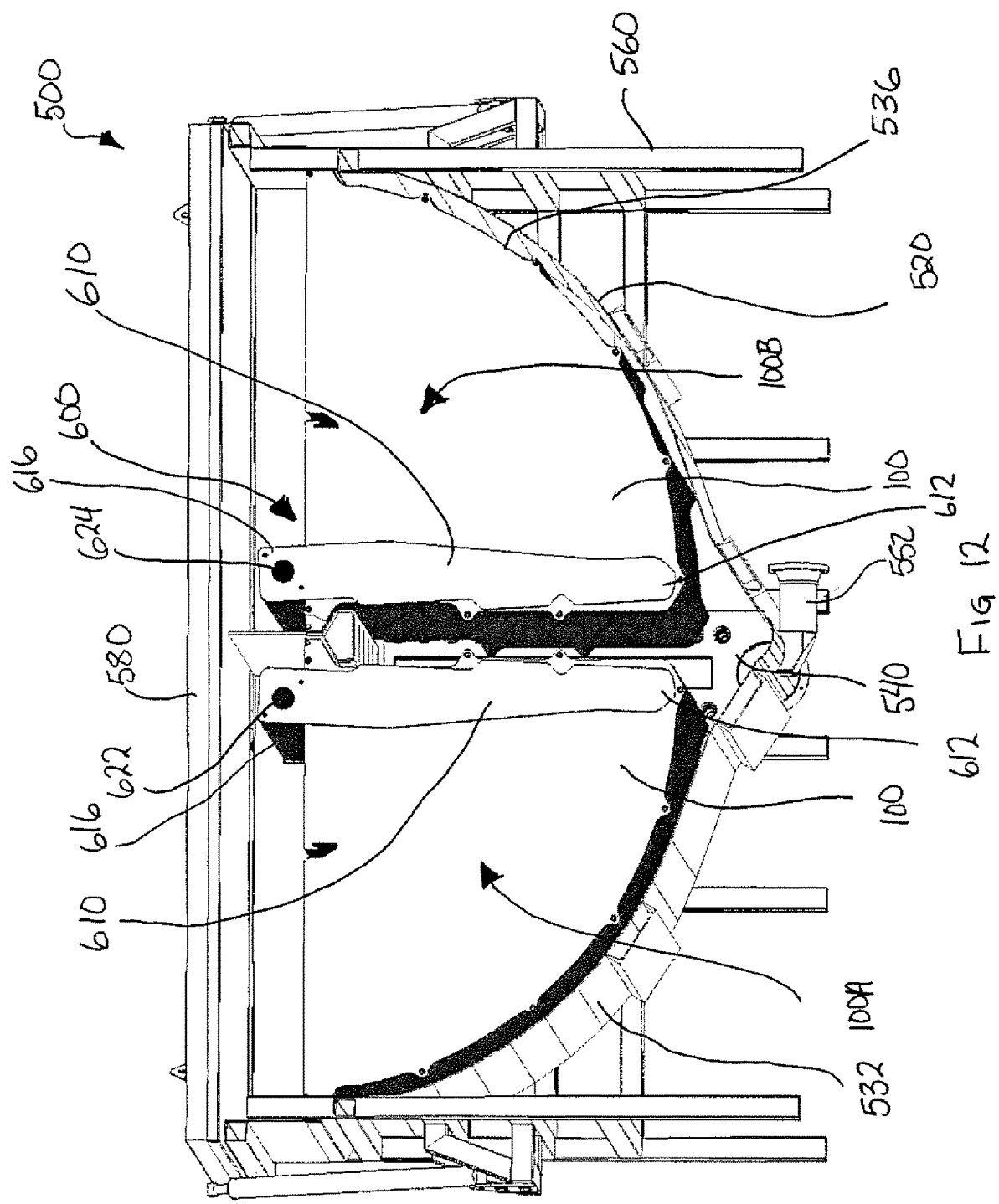

US 11,639,640 B2

ELECTRO-SEPARATION CELL WITH SOLIDS REMOVAL

CROSS REFERENCE TO RELATED APPLICATIONS

This application is a continuation of U.S. application Ser. No. 15/562,916, filed Sep. 29, 2017, which is a national stage entry of PCT/CA2015/000196, filed Mar. 31, 2015, the disclosures of each of which are hereby incorporated by reference as if fully restated herein.

TECHNICAL FIELD

The present invention relates to a system and method for separating oil-based drilling fluids using an electro-separation cell and more particularly to a system and method for removing sediment and other solids from an electro separation cell.

BACKGROUND

Invert emulsion drilling fluid (commonly called drilling mud) is used when drilling boreholes in the ground, such as for drilling oil or gas wells, etc. It is typically pumped through the drill string and out a nozzle on the drill bit during the drilling of the hole so that the drilling fluid can keep the drill bit cool and carry rock, clay and other solids (commonly referred to as cuttings) removed from the well by the drill bit up the annulus of the well and back to the surface.

Invert emulsion drilling fluids are typically water based or oil based. Oil based muds usually contain oil in the form of a petroleum product similar to diesel fuel. In addition to the oil, these oil based drilling fluids can also contain viscosifiers, weighting agents and other filtrate control additives. To remove the cuttings from the drilling fluid that has been returned to the surface, solids control equipment in the form of shakers, conveyors, centrifuges, etc. are used to remove the majority of the native clays or drill solids that make up the cuttings.

However, these solids control equipment are not designed to re-capture the base oils necessary to create the drilling fluids. It is the presence of hydrocarbons which are physically and chemically bound to the fines, as well as additives, that make separation and recapture through conventional means difficult. There have been attempts to re-capture the hydrocarbons in these drilling fluids using electro-separation, creating an electric field in the drilling fluids to cause the contents of the drilling fluid to separate out. However, while the hydrocarbon that separates out can be easily dealt with, since it simply rises to the top of the medium being treated, the solids and sediment separating out of the drilling fluid can cause problems with electro-separation systems.

SUMMARY OF THE INVENTION

In a first aspect, an electro-separation apparatus for separation of drilling fluids is provided. The apparatus can include: a reaction chamber; a set of parallel-spaced electrode plates provided in the reaction chamber; a sediment outlet positioned proximate a bottom of the reaction chamber to remove sediment from the reactor chamber; a plurality of wiper blades, each wiper blade positioned between a pair of adjacent electrode plates and moveable between a first position and a second position to remove sediment from the electrode plates and move the sediment towards the sediment outlet; and a power supply connected to the set of parallel-spaced electrode plates to create an electric field between the set of parallel-spaced electrode plates.

In a further aspect, each wiper blade in the electro-separation apparatus is moveable from the first position to the second position by the wiper blade being rotatable around an axis and the axis is positioned at a radius of curvature of the curved side wall, at a center of curvature of the curved side wall.

In a further aspect, the electro-separation apparatus can include: a first curved side wall; a second curved side all; a first set of parallel-spaced electrode plates provided in the reaction chamber positioned along the first curved side wall; second set of parallel spaced electrode plates provided in the reaction chamber positioned along the first curved side wall; and a plurality of wiper blades, a first set of wiper blades positioned between the electrode plates in the first set of parallel-spaced electrode plates and moveable between a first position and a second position to remove sediment from the electrode plates and move the sediment towards the sediment outlet, and a second set of wiper blades positioned between the electrode plates in the second set of parallel-spaced electrode plates and moveable between a first position and a second position to remove sediment from the electrode plates and move the sediment towards the sediment outlet.

DESCRIPTION OF THE DRAWINGS

A preferred embodiment of the present invention is described below with reference to the accompanying drawings, in which:

FIG. 12 is a cut-away schematic view of the electro-separation apparatus of FIG. 7 with a wiper assembly in a finishing position.

DETAILED DESCRIPTION OF THE ILLUSTRATED EMBODIMENTS

Figure 1:
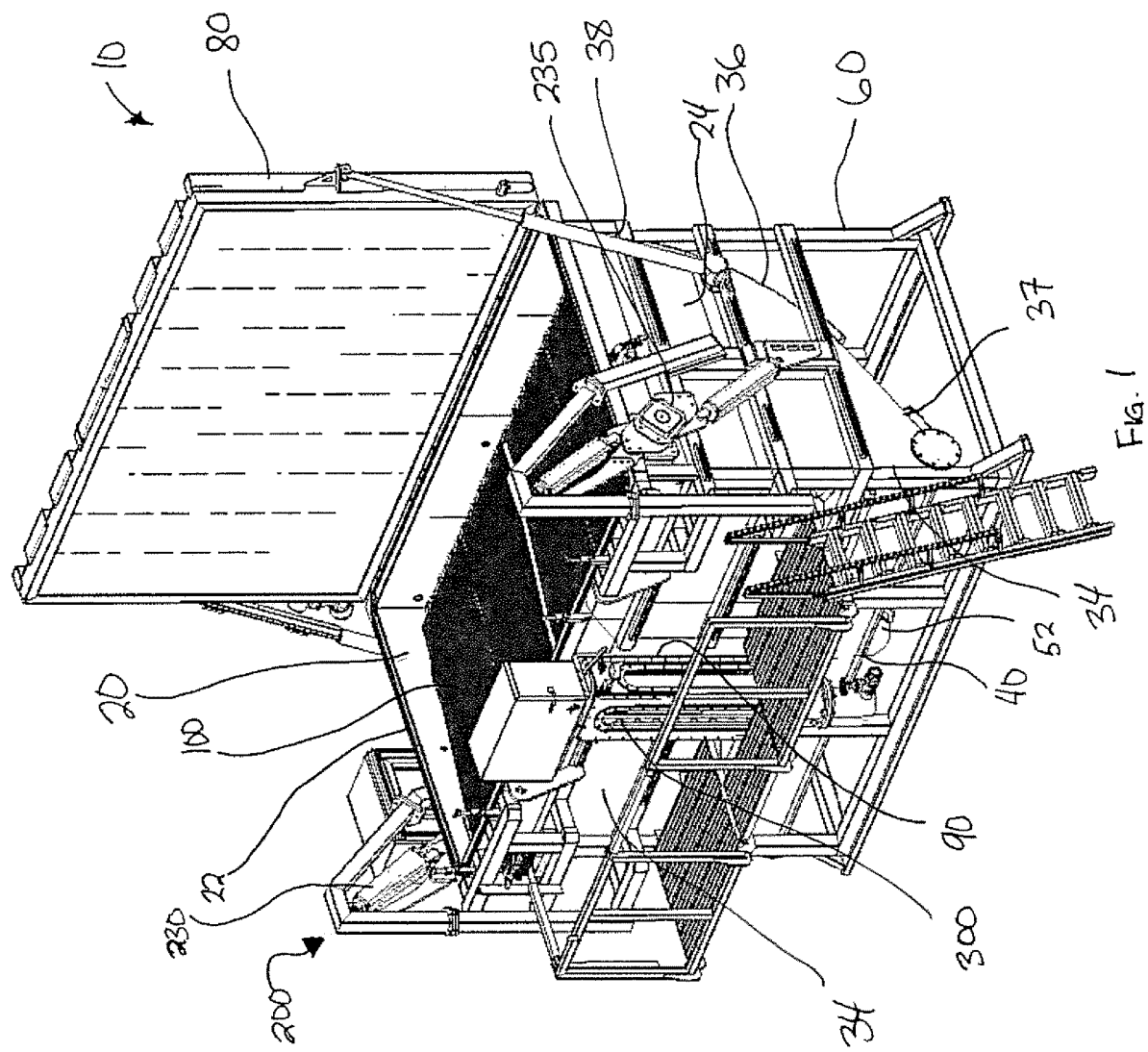
FIG. 1 is a front perspective view of an electro-separation apparatus for separating oil-based drilling fluid.
Figure 2:
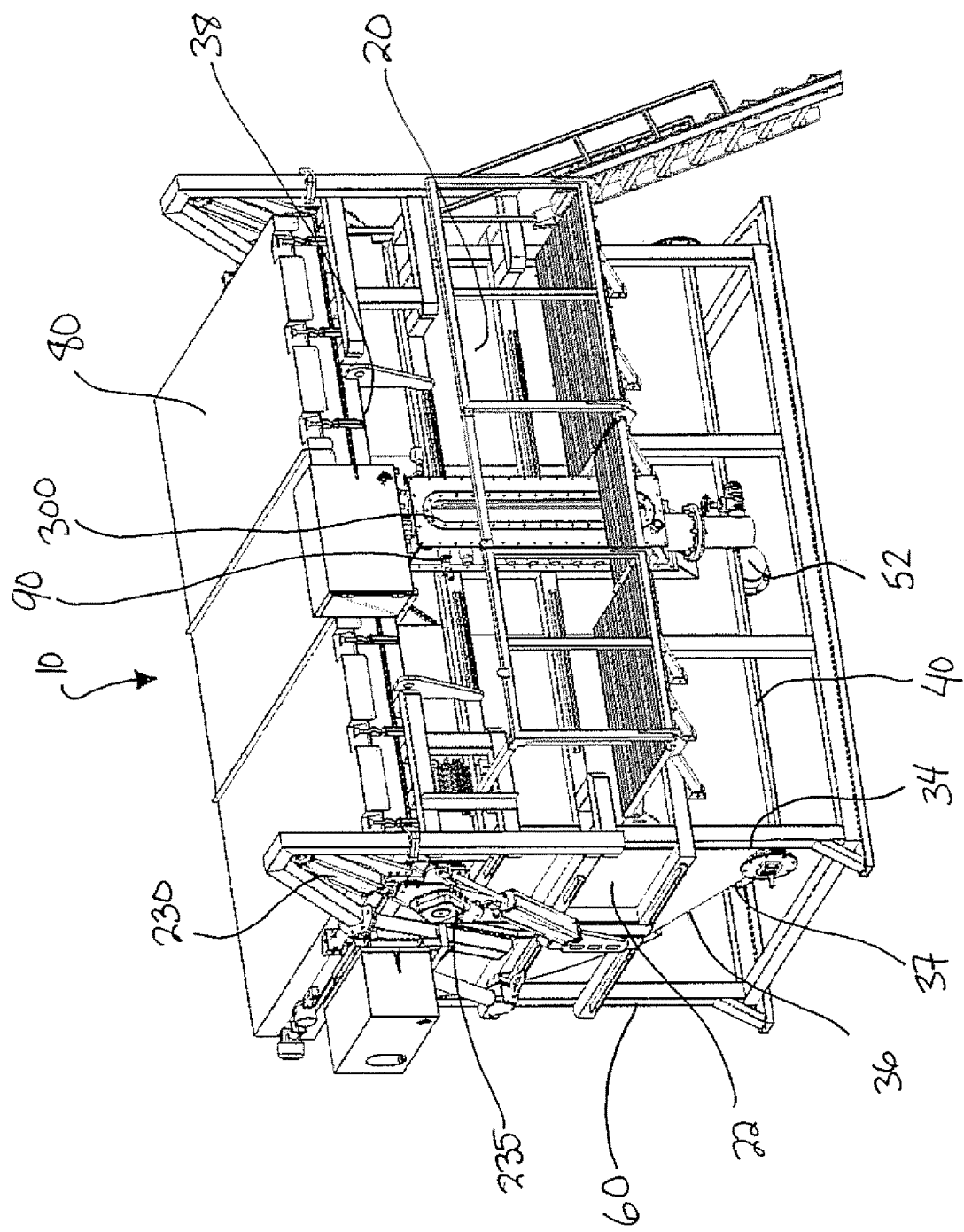
FIG. 2 is a back perspective view of the electro-separation apparatus shown in FIG. 1.

FIGS. 1 and 2 illustrate an electro-separation apparatus 10 for removing hydrocarbon petroleum products from cuttings (including colloidal and ultra-fines) in oil-based drilling fluids. Electrokinetics, in conjunction with hydraulic vibration, is used to influence the movement of hydrocarbons within the drilling fluid medium. Direct current (DC) electricity provides the primary force in the form of electrokinetic phenomena. By using the electro-separation apparatus 10 to apply an electrical field to a volume of oil based drilling fluid or mud for the segregation of hydrocarbons from the drilling fluid medium and corresponding sediment (the native clays and drill cuttings), a hydrocarbon supernatant is formed that is clear of solid particles (equal to and in some cases less than 1%) while sediment settles towards the bottom of the electro-separation apparatus 10.

The electro-separation apparatus 10 can include a tank forming a reaction chamber 20 and a set of parallel-spaced electrode plates 100 provided in the reaction chamber 20. The reaction chamber 20 can form a liquid tight enclosure with two end walls 22, 24, a straight side wall 32 and a curved side wall 36. The straight side wall 32 can be provided so that it is substantially vertical while a top 38 of the curved side wall 36 can start at the top of the reaction chamber 20 and curve towards the straight side wall 32 as you move down the curved side wall 36 until the bottom end 37 of the curved side wall 36 ends proximate a bottom end 34 of the straight side wall 32. A collection trough 40 can be provided between the bottom end 37 of the curved side wall 36 and the bottom end 34 of the straight side wall 32 so that solids and sediment that has settled out of the fluid being treated can collect in this collection trough 40. The curved side wall 36 can curve with a substantially constant radius from a top end 38 to proximate a bottom end 37 of the curved side wall 36 where past the bottom end 37 of the curved side wall 36 the wall angles further out to start forming the collection trough 40.

The length of the straight side wall 32 and the curved side wall 36 can be longer than the lengths of the end walls 22, 24 so that that the entire reaction chamber 20 has an elongate form.

The collection trough 40 can be provided at the bottom end 34 of the straight side wall 32 and at the bottom end 37 of the curved side wall 36 to collect solids and sediment that settles out of the drilling fluid being treated. The collection tough 40 can run along the length of the reaction chamber 20 from the first end wall 22 to the second end wall 24 and parallel to the straight side wall 32 and the curved side wall 36.

An auger (not shown) can be provided in the collection trough 40 to move the solids and sediment that collects in the collection trough 40 towards a sediment outlet 52 in the collection trough 40 where the sediment can be removed from the collection trough 40. In one aspect, the auger can have flighting positioned in a first direction along a first portion of the auger and flighting positioned in a second direction, opposite direction, along a second portion of the auger. The sediment outlet 52 can be provided between the first portion and the second portion of the auger. In this manner, when the auger is rotated in one direction the two different directions of the flighting in the two different portions can move solids and sediment in the collection trough 40 towards the sediment outlet 52 even though it is provided at or near the middle of the auger and the reaction chamber 20.

A framework 60 can be provided to support the reaction chamber 20.

A plurality of parallel-spaced electrode plates 100 can be provided inside the reaction chamber 20. These electrode plates 100 can be formed from stainless steel, carbon steel or aluminum and can be insulated from the end walls 22, 24, the straight side wall 32 and the curved side wall 36 by the use of a non-conductive liner that covers the interior surfaces of the reactor chamber 20 so that the non-conductive liner is positioned between the edges of the electrode plates 100 and the straight side wall 32 and the curved side wall 36 to prevent the electrode plates 100 from coming into electrical contact with the inside surfaces of the reaction chamber 20 and pass electrical current to the reaction chamber 20 itself. In one aspect, the non-conductive liner could be made of ultra-high-molecular-weight polyethylene (UHMWPE), fiberglass that has hydrocarbon resistant resin, etc.

Figure 3:
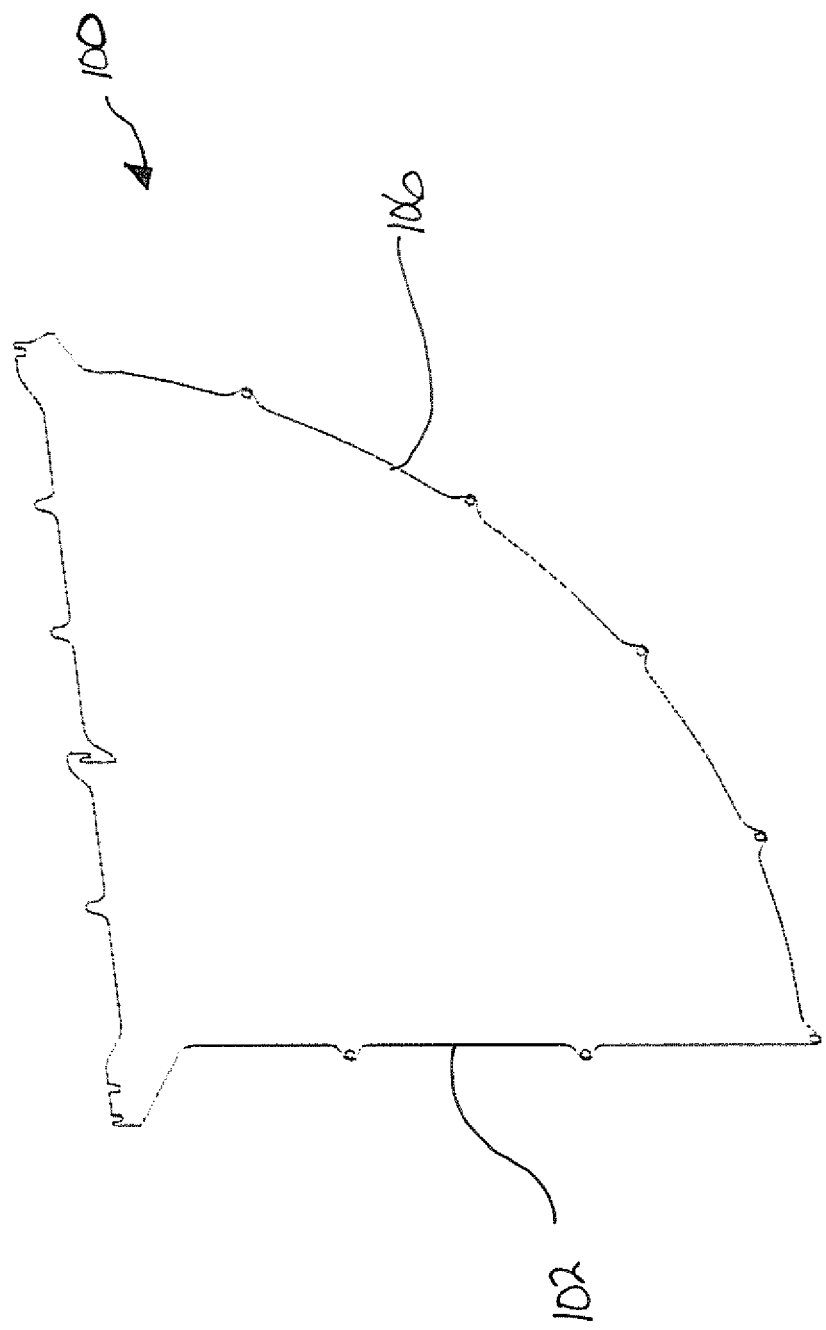
FIG. 3 is side view of an electrode plate used in the electro-separation apparatus shown in FIG. 1.

Each of the electrode plates 100 can be a plate as shown in FIG. 3. In one aspect, the electrode plates 100 can have a straight side 102 to substantially conform to the straight side wall 32 of the reactor chamber 20 and an opposite curved side 106 to substantially conform to the curved side wall 36 of the reaction chamber 20. In one aspect, the electrode plate 100 may be a flat plate. When the electrode plates 100 are positioned in the reactor chamber 20, the electrode plates 100 can be provided parallel so that each one is parallel to the adjacent electrode plates 100 and oriented vertically in the reaction chamber 20 so that a spacing is formed between adjacent electrode plates 100 and the electrode plates 100 are positioned spaced parallel from one another running along substantially the entire length of the reaction chamber 20 from the first end wall 22 to the second end wall 24. The straight side 102 of each electrode plate 100 will be provided adjacent to the straight side wall 32 of the reaction chamber 20 and the curved side 106 will be provided adjacent to the curved side wall 36 of the reaction chamber 20.

In one aspect, the spacing between adjacent electrode plates 100 could be between 0.25 inches and 3 inches. In a further aspect, the electrode plates can be between 0.25 and 2 inches and in one aspect substantially 1.5 inches apart. In this manner, the electrode plates 100 are parallel spaced a distance between 0.25 inches and 3 inches along substantially an entire length of the reaction chamber 20.

The electrode plates 100 can be connected to a voltage supply so that a voltage can be connected across adjacent electrode plates 100 to create an electric field in the drilling fluid medium being treated between adjacent electrode plates 100 in the reaction chamber 20. Typically, the electrode plates 100 will be alternately positively and negatively charged so that electrical fields can be created between all of the electrode plates 100 in the set of electrode plates 100.

A lid 80 can be provided to cover an open top of the reaction chamber 20. The lid 80 can be provided so that a headspace is created above the electrode plates 100 and below the lid 80 in the reactor chamber 20 when the lid 80 is closed. The lid 80 and the reactor chamber 20 can form a seal so that the interior of the reactor chamber 20 is hermetically sealed when the lid 80 is closed, preventing air and other gases from entering and exiting the top of the reactor chamber 20. A blanket of nitrogen can be provided in this headspace to prevent a buildup of oxygen in the headspace as a result of anode/cathode reactions occurring in the reaction chamber 20 and allowing the electro-separation apparatus 10 to meet a 'Type X' designation so that it may be used in hazardous environments. The headspace inside of the electro-separation apparatus 10 can be continuously monitored by an oxygen sensor and if the oxygen sensor determines that the level of oxygen in the headspace reaches an undesired level, more nitrogen can be routed into the headspace in order to reduce the oxygen level and eliminate a possible explosion in the headspace.

The pressure in the reactor chamber 20 can also be monitored in order to ensure the seal of the lid 80 and the reactor chamber 20 is not compromised.

Additionally, the sealing of the interior space of the reactor chamber 20 by the lid 80 allows the fluid in the reactor chamber 20 to be pressurized during operation of the electro-separation apparatus 10. In one aspect, the nitrogen in the headspace can be pressurized so that the pressure in the reactor chamber 20 is above atmospheric pressure. In one aspect, the pressure in the reactor chamber 20 can be between 1 to 5 psi above atmospheric pressure.

During the processing of the batch of drilling fluid in the electro-separation apparatus 10, the batch of drilling fluid will separate into a number of stratified layers in the reactor chamber 20. An upper stratification layer or supernatant layer containing a high concentration of hydrocarbon will rise to the top of the reactor chamber 20 and collect on the surface of the drilling fluid. Below the upper stratification layer, a medium stratification layer will occur. This medium stratification layer will contain a low percentage of particles (fines and cuttings). Below the medium stratification layer solids and sedimentation will settle out of the fluid being treated and because of its higher density, fall towards the bottom of the reactor chamber 20. This lower layer of solids and sediment will typically contain a highly viscous semi-consolidated invert drilling fluid mass and the majority of the fines and cuttings from the drilling fluid will form as solids and sediment in this layer. Any thickening agents, such as barite and other chemicals used in the preparation of the drilling fluid, will likely also be contained in this lower fluid mass layer.

The solids and sediment will settle out of the drilling fluid during its treatment and these solids and sediment will sink towards the bottom of the reactor chamber 20 and the collection trough 40 where it can be removed from the reaction chamber 20 through the sediment outlet 52. However, some of these solids and sediment will attach to the electrode plates 100 and the curving side wall 36 before it sinks all the way to the collection trough 40, coating the electrode plates 100 and the curving side wall 36 with solids and sediment. Theses solids and sediment can cause problems with the functioning of the electro-separation apparatus 10. Not only will less solids and sediment potentially be removed from the reactor chamber 20 after each batch of drilling fluid has been treated because some of the solids and sediment will remain in the reaction chamber 20 clinging to the electrode plates 100 and curving side wall 36 after the reactor chamber 20 is unloaded, but additionally, coating the electrode plates 100 with this sediment can hinder the direct current power from passing through the drilling fluid in the reactor chamber 20. To address this buildup of solids and sediment in the reaction chamber 20, a wiper assembly 200 can be used that in conjunction with the curved side wall 36 will move solids and sediment that has collected on the curved side wall 36 and the electrode plates 100 towards the collection trough 40. The shape of the reaction chamber 20 is designed for solids and sediment collection at the base of the reaction chamber 20 in the collection trough 40.

Figure 4:
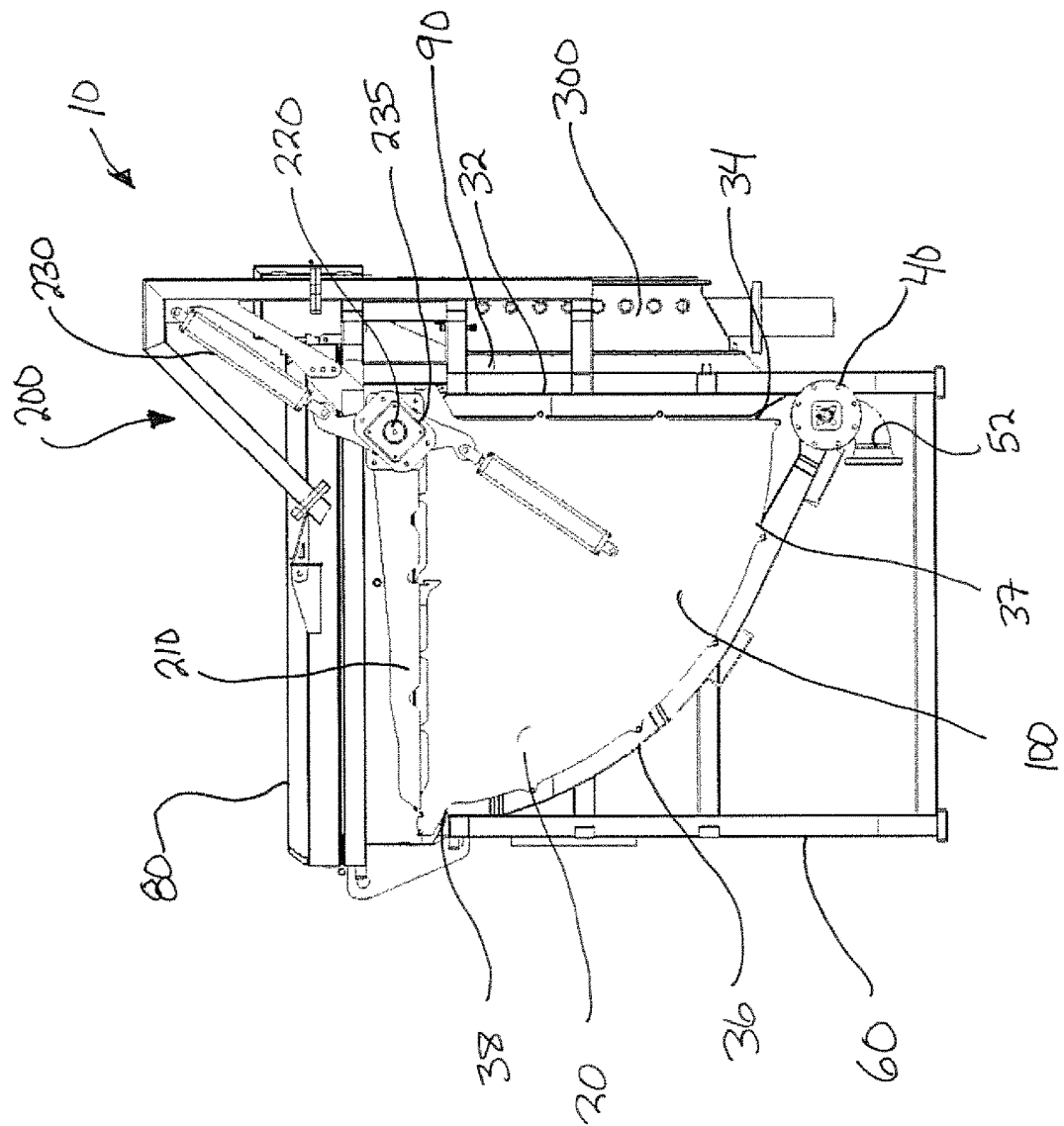
FIG. 4 is a schematic end view of the electro-separation apparatus shown in FIG. 1 with a wiper assembly shown in a starting position.
Figure 5:
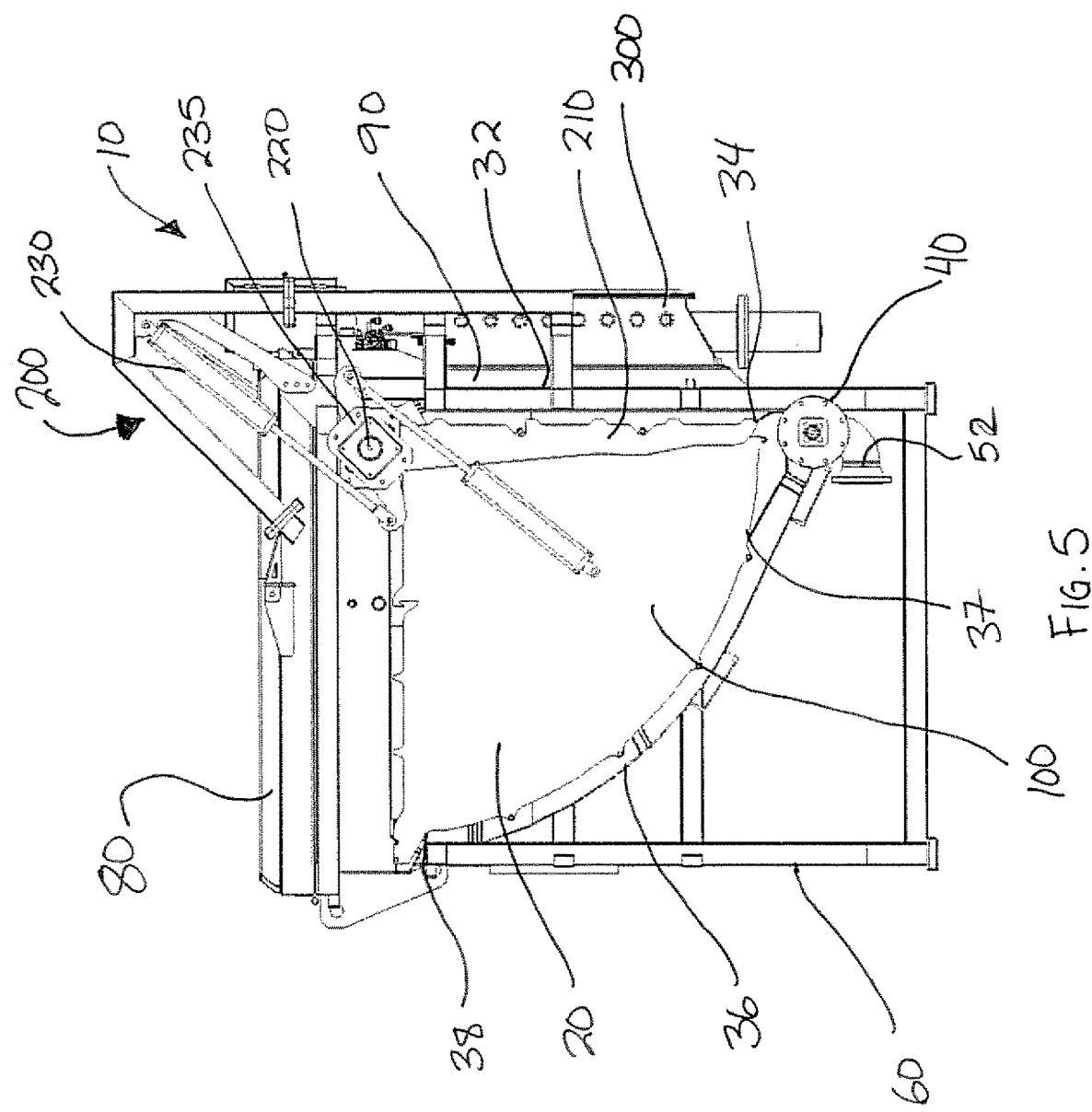
FIG. 5 is a schematic end view of the electro-separation apparatus shown in FIG. 1 with the wiper assembly shown in a finished position.

FIGS. 4 and 5 show the wiper assembly 200 in more detail. The wiper assembly 200 can have a number of wiper blades 210 with each wiper blade 210 attached to an axle 220 with the axle 200 forming an axis around which the wiper blade 210 is rotatable. The axle 220 can be positioned near the top of the straight side wall 32 so that the wiper blades 210 extend from the axle 220 towards the curved side wall 36. The axle 200 can be positioned at a radius of curvature of the curved side wall 36, at a center of curvature of the curved side wall 36, so that the axle 220 is positioned at a center of curvature of the curved side wall 36.

Figure 6:
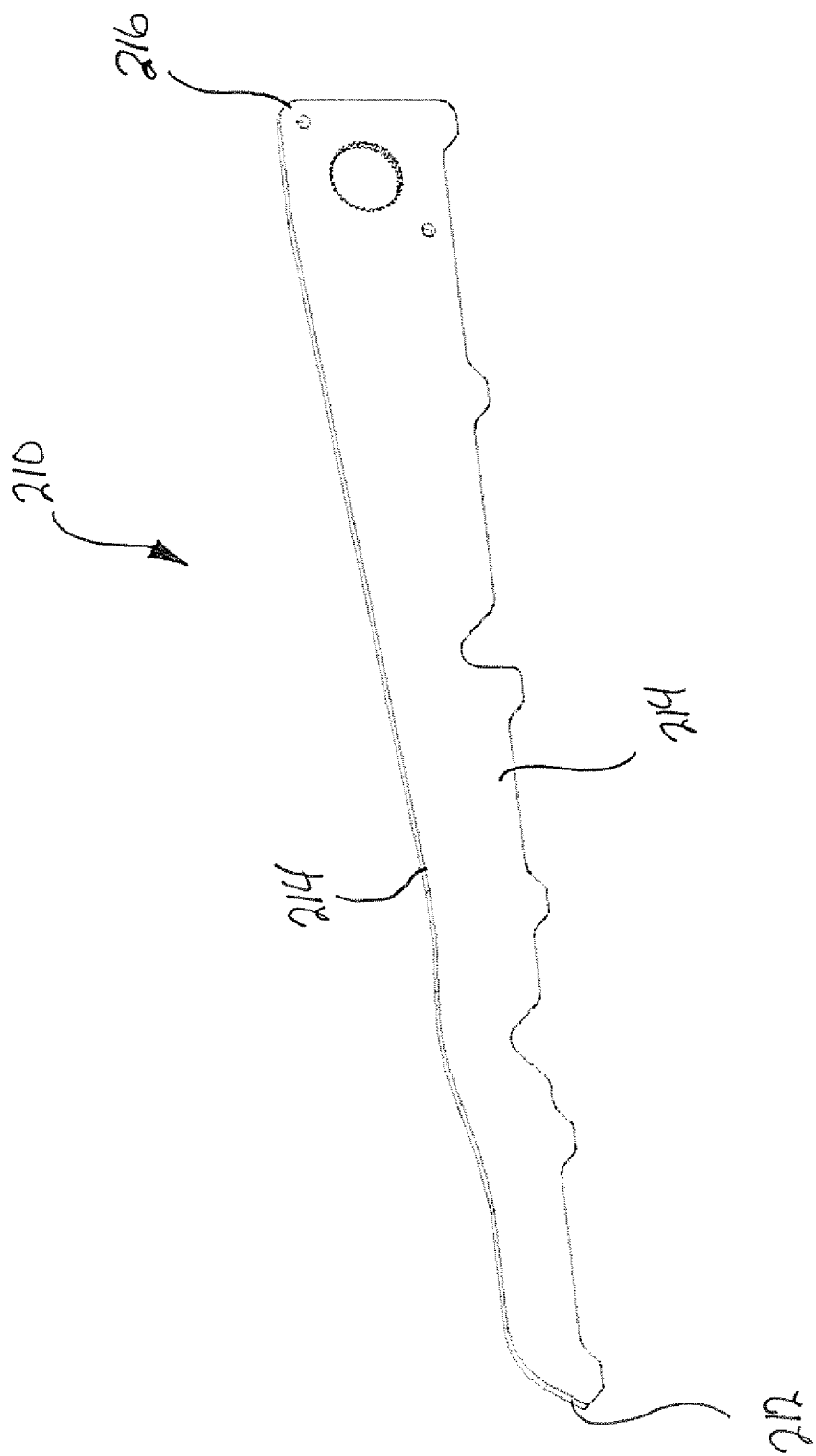
FIG. 6 is a perspective view of a single wiper blade.

FIG. 6 illustrates a single wiper blade 210. Each wiper blade 210 can be made of a non-metallic material and have a tip 212 and a proximal end 216 with the proximal end 216 attached to the axle 220. Each wiper blade 210 can also have a length running from the center of the axis formed by the axle 220 to the tip 212 of the wiper blade 210 that is substantially the length of the radius of curvature between the curved side wall 36 and the axle 220 leaving just a gap between the tip 212 and the curved side wall 36. The curvature of the curving side wall 36 can be constant along all or a lot of its length and the length of the wiper blades 210 between its tip 212 and the center of axis formed by the axle 220 the wiper blade 210 is attached to can be substantially the radius of curvature of the curved side wall 36 with a gap between the tip 212 and the curved side wall 36 so that a tip 212 of the wiper blade 210 can follow along the curvature of the curved side walls 36 as the wiper blade 210 is rotated around the axis formed by the axle 220 while a substantially constant gap is maintained between the tip 212 and the curved side wall 36. Each wiper blade 210 can have a width that is substantially the same as the spacing between adjacent electrode plates 100 so that edges of the wiper blade 210 can sweep across the inner surfaces of the adjacent electrode plates 100.

Referring again to FIGS. 4 and 5, one or more hydraulic cylinders 230 can be used to rotate the axle 220 and thereby rotate the wiper blades 210 around the axle 220. The hydraulic cylinders 230 can be attached to the axle 220 by a plate 235. As the wiper blades 210 are rotated by the axle 220 around their proximal ends 216 and an axis formed by the axle 220, the wiper blades 210 will rotate downwards between the electrode plates 100 and the tips 212 of the wiper blades 210 will move down along a curve corresponding to the curve on an inside surface of the curving side walls 36. The edges 214 of each wiper blade 210 can also scrape the electrode plates 100 as the wiper blade 210 is rotated by the axle 220, removing sediment that has built up on the electrode plates 100.

FIG. 4 illustrates the wiper assembly 200 in the starting or first position with the wiper blades 210 positioned above or near a top of the electrode plates 100 and the tips 212 of the wiper blades 210 at or above the top end 38 of the curving side walls 36 with the wiper blade 210 positioned extending substantially horizontally. The shape of the reaction chamber 20 lends itself to effectively sweep the solids and sediment, as well as the colloids, to the lowest point of the reaction chamber 20, which will be the collection trough 40, for removal of the sediment from the reaction chamber 20. The shape of the reaction chamber 20 effectively represents the centripetal movement of the solids by the wiper blades 210.

In operation, the axle 220 is rotated which causes the wiper blades 210 to rotate around the axis formed by the axle 220 causing the wiper blades 210 to sweep downwards between the electrode plates 100 with the edges 214 of the wiper blades 210 removing sediment that has built upon the electrode plates 100 and the tips 212 of the wiper blades 210 scraping off sediment from the inside surface of the curving side walls 36.

FIG. 5 illustrates the wiper assembly 210 in a finished or second position where the wiper blades 210 are positioned at or adjacent to the straight side wall 32 with the edges 214 and the tips 212 of the wiper blades 210 having scraped sediment off the electrode plates 100 and the surface of the curving side wall 36 and downwards into the collection trough 40. In the second position, the wiper blade 210 can be positioned substantially vertically. After the wiper assembly 200 has swept the wiper blades 210 to this finishing position, the wiper blades 210 can be rotated back up to the starting position shown in FIG. 4 to be used again to scrape sediment from the reactor chamber 20.

One or more hydraulic vibrators (not shown) can be provided in physical contact with the reactor chamber 20 so that the vibrators can be used to vibrate the reactor chamber 20 and the drilling fluid therein in an attempt to loosen sediment that has collected on the electrode plates 100, end walls 22, 24, straight side wall 32 and curved side wall 36.

During operation of the electro-separation apparatus 10, hydrocarbons will separate from the drilling mud. Unlike the sediment, the hydrocarbons will rise to the top of the reaction chamber 20 where this top layer of accumulated hydrocarbons can be removed through a liquid outlet 90 after the drilling fluid has been treated in the electro-separation apparatus 10. The liquid outlet 90 can be one or more apertures provided passing through the straight side wall 32 and starting proximate a top end of the straight side wall 32 so that the hydrocarbon that has collected on top of the medium in the reactor chamber 20 can be drained off separately from the underlying liquid.

In one aspect, the liquid outlet 90 can be used in conjunction with a skimmer 300 to remove the top layer of accumulated hydrocarbons from the reactor chamber 20 after the drilling fluid has been treated in the electro-separation apparatus 10. The skimmer 300 can include a clear well that is in fluid communication with the reactor chamber 20 by the liquid outlet 90 and runs the depth of the straight side wall 32 the skimmer 300 is installed on. Liquid from the reactor tank 20 can enter the clear well through the liquid outlet 90. Inside the skimmer 300, a vertical telescoping tube can be provided in the clear well. The telescoping tube can be raised so that a top of the telescoping tube is above the surface of the drilling fluid being treated and then lowered below the surface of the treating fluid so that treated fluid will enter the telescoping tube and be routed away. The top of the telescoping tube can be lowered down to the level where a person wants to drain the top layer out of the reactor chamber and all the fluid above the top of the telescoping tube will drain into the open top of the telescoping tube and out of the reactor chamber 20.

In one aspect, the telescoping of the telescoping tube could be electronically controlled. An electronic specific gravity reader could read the specific gravity of the treated drilling fluid in the reactor chamber and the depth where a targeted specific gravity of the drilling fluid is determined (identifying where a upper layer of hydrocarbon supernatant ends) could be used to lower the top of the telescoping tube to this identified depth, causing this upper layer of fluid to drain out of the reactor chamber 20 and then leaving behind the denser, less desirable fluid.

In operation, a batch of drilling fluid can be introduced into the reaction chamber 20 when the wiper assembly 200 is in the starting position shown in FIG. 4 so that the drilling fluid fills the reaction chamber 20 between the electrode plates 100. An electric field can then be generated between the electrode plates 100 to subject the batch of drilling fluid in the reaction chamber 20 to an electro-separation stage. A DC voltage can be applied across the electrode plates 100 to create an electric field between the electrode plates 100 that passes through the batch of drilling fluid in the reaction chamber 20. Typically, as the hydrocarbons, solids and sediment separate in the drilling fluid, the voltage can be decreased or increased to keep the amperage constant. As the solids and sediment settle out, the current can more easily pass through these condensed solids and sediment that are forming near the bottom of the housing.

The electric field applied between the electrode plates 100 can cause the separation of the drilling fluid in the batch through the use of the process of electrokinetics to destabilize the bonds between the hydrocarbon, the fines and other cuttings and the drilling fluid. Electrokinetics involves the processes of; electrophoresis, dielectrophoresis, electromigration and electroosmosis. Electrophoresis is the primary phenomenon which occurs in the drilling fluid. Electrophoresis involves the movement of charged particles through a fluid medium under the influence of an electrical field. This process acts to reduce ultra-fine colloidal particles in the drilling fluid. Dielectrophoresis involves the movement of uncharged particles under a non-uniform electrical field. This is dependent on the fluid medium, particle properties, particle size and gradient of the voltage field. Electromigration involves the movement of ions towards the electrodes of opposite charge. The electric field destabilizes the emulsion, allowing hydrocarbons to be released. Electroosmosis involves the movement of water from anode (+) to cathode (−). Applied DC current breaks any bonds that water may have with other particles and allows it to migrate within the drilling fluid.

During this electro-separation stage, the electric field can be maintained for a period of time, allowing the electrokinetic effect to act on the drilling fluid and the hydrocarbon to separate from the solids and the sediment (the fines and cuttings). In one aspect, this could be a few hours or more, however, the amount of time will vary on the conditions of the drilling fluid, size of the reactor chamber 20, number of electrode plates 100, etc. As the electric field continues to be passed through the drilling fluid, hydrocarbon segregated from the solids and sediment, rise to the surface of the drilling fluid and solids and sediment will continue to settle out towards the bottom of the reaction chamber 20, some of which will settle on the curving side wall 36 and the surfaces of the electrode plates 100.

The wiper assembly 200 can be used to remove sediment from the surfaces of the electrode plates 100 that has been deposited there during the electro-separation stage. Referring to FIG. 4, the wiper assembly 200 will begin with the wiper blades 210 in the starting or first position, with the wiper blades 210 positioned above or near a top of the electrode plates 100 and the tips 212 of the wiper blades 210 positioned at or near the top of the curving side wall 36 extending substantially horizontally. The hydraulic cylinders 230 can then rotate the axle 220 so that the wiper blades 210 are rotated and sweep downwards between the electrode plates 100 with the edges 214 scraping sediment of the electrode plates 100 while the tips 212 of the wiper blades 210 run down and along the curving side wall 36. This sweep of the wiper blades 210 will continue, moving sediment that has collected on the electrode plates 100 between the electrode plates 100 and the curving side walls 36 downwards and towards the collection trough 40 where the sediment will eventually be removed from the reaction chamber 20 through the sediment outlet 52. Eventually, the sweep of the wiper blades 210 will end at the finishing position shown in FIG. 5.

The wiper apparatus 200 can be used at the end of the treatment cycle to remove the sediment (as well as colloids and water) from the reaction chamber 20 through the collection trough 40 after the high quality base/synthetic oil has been removed from the reaction chamber 20 by the skimmer 300. The wiper apparatus 200 can move this sediment (and colloids and water) into the collection trough 40 where it will be augured towards the sediment outlet 52 and removed from the reaction chamber 20 through the sediment outlet 52 to allow a new batch of drilling fluid to be loaded into the reaction chamber 20 for treatment. In one aspect, the wiper assembly 200 can repeat this action several times prior to the next batch of drilling fluid being loaded in order to effectively remove any residual solids and sediment that may not have been recovered on the first sweep, second sweep, etc. of the reaction chamber 20.

Additionally, the wiper apparatus 200 can also be used to sweep the reaction chamber 20 before the end of the treatment of the drilling fluid and before the hydrocarbon is removed from the reaction chamber 20. This can be done to move sediment that has collected on the surfaces of the electrode plates 100 and the inside surface of the curving side wall 36 towards the collection trough 40 during the treatment of the drilling fluid and prevent too much sediment from building up on these surfaces or to simply move the sediment towards the collection trough 40 in preparing for it to be removed when the treatment of the drilling fluid in the reaction chamber 20 is complete.

The vibrators can be also be used to vibrate the reaction chamber 20 to try and cause sediment that has collected on the electrode plates 100, the end walls 22, 24, the straight side wall 32 or the curved side wall to be shaken off or even to be loosened enough to be scraped off by the wiper blades 210. By vibrating the reaction chamber 20 not only can this exacerbate the fluid medium into a highly vibratory state in order to release and free fluid that is trapped throughout the medium, but it also can cause sediment or other solids that have collected along the electrode plates 100 because of high surface tension to vibrate loose and fall off the electrode plates 100 or even just loosened to make the wiper blades 310 more effective at scraping it off. The vibrators can be used at the same time as the sweeping assembly 200 to both vibrate off the sediment and scrape it off with the wiper blades 210 or at different times, such as before the sweeping apparatus 200 is used to try and loosen the sediment from the electrode plates 100 before the wiper blades 210 sweep along the electrode plates 100.

In some aspects, the pressure in the reaction chamber 20 can be increased above atmospheric pressure to aid in the separation of the drilling fluid.

Figure 7:
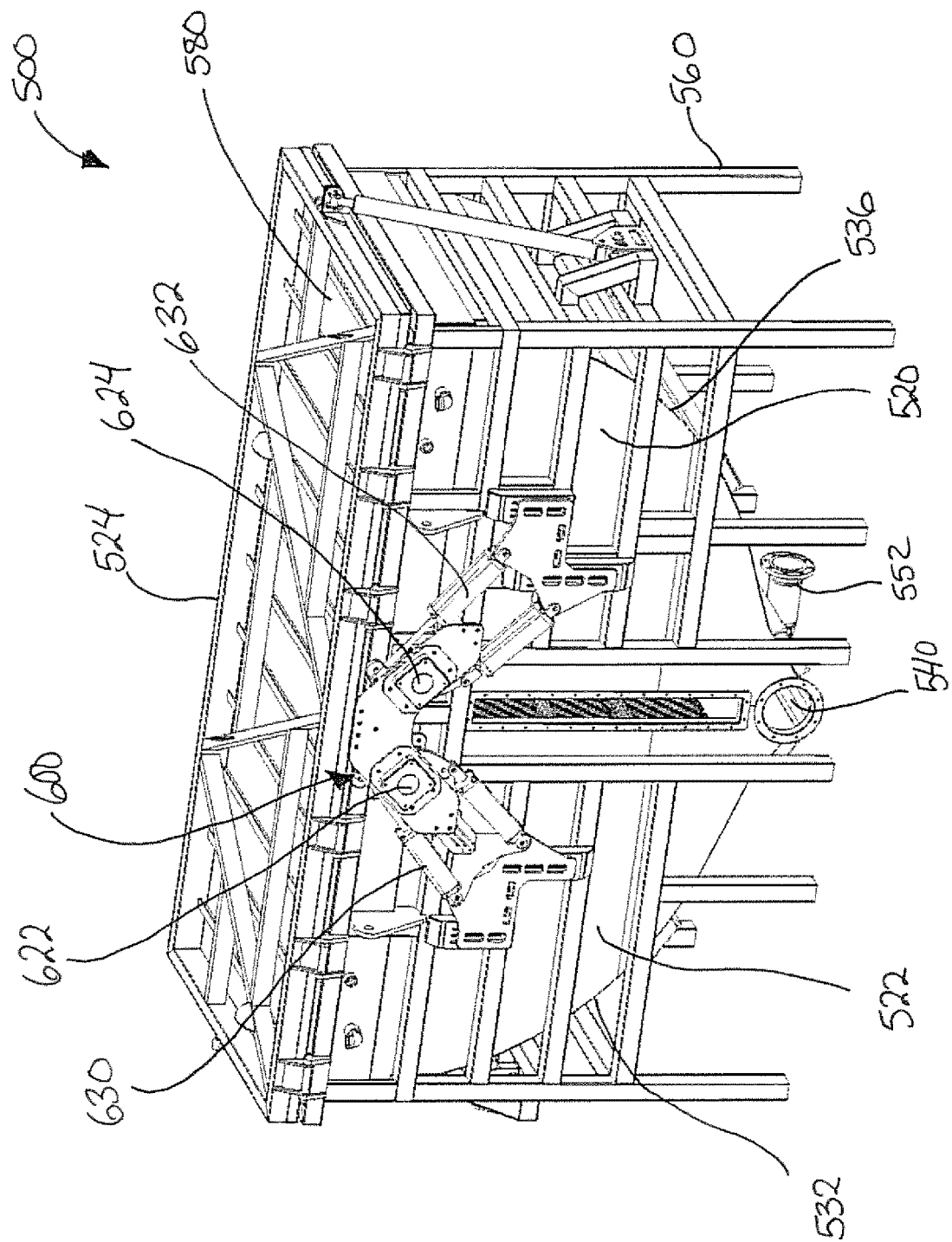
FIG. 7 is a front perspective view of an electro-separation apparatus in a second aspect.
Figure 8:
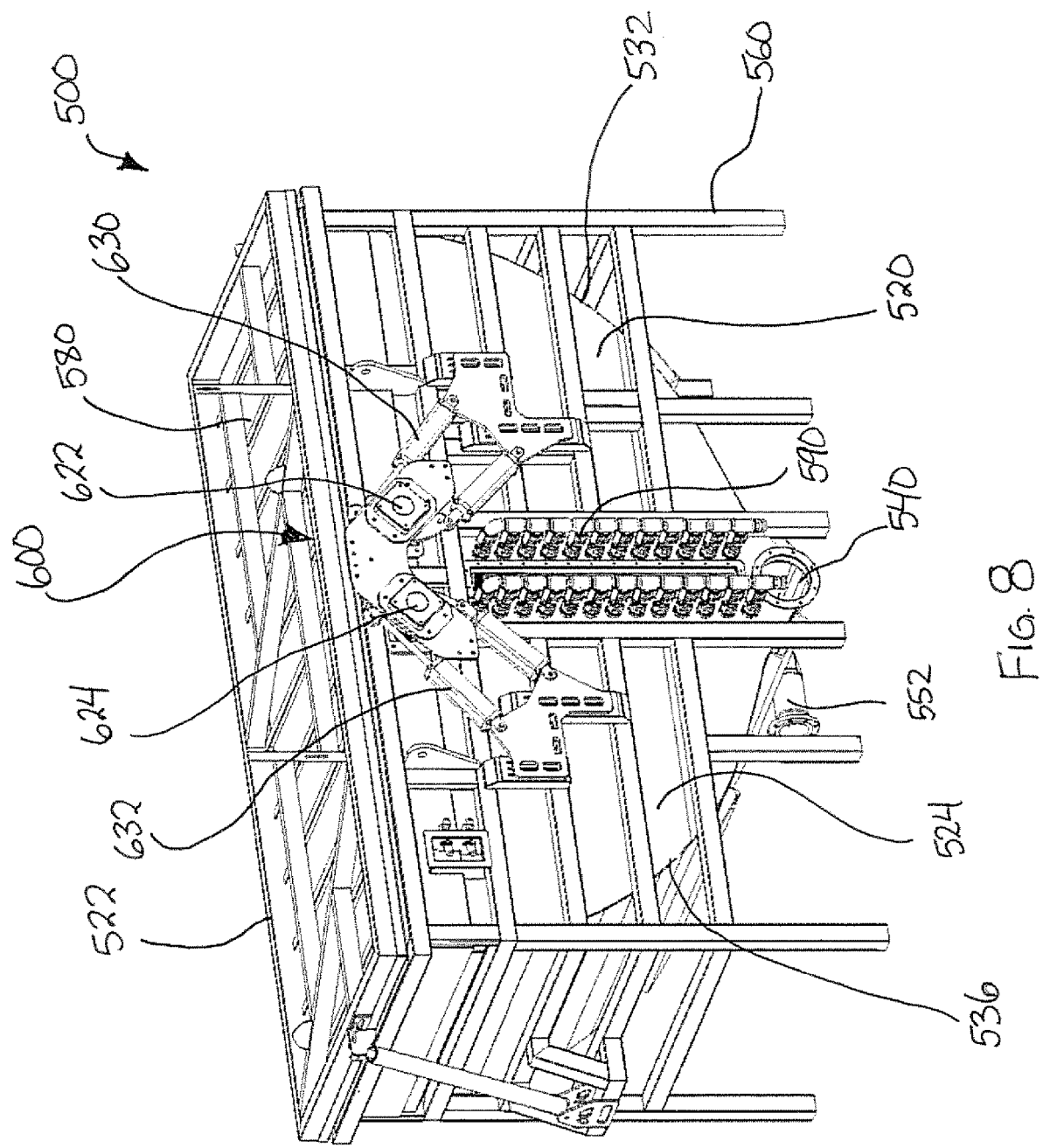
FIG. 8 is a back perspective view of the electro-separation apparatus shown in FIG. 7.
Figure 9:
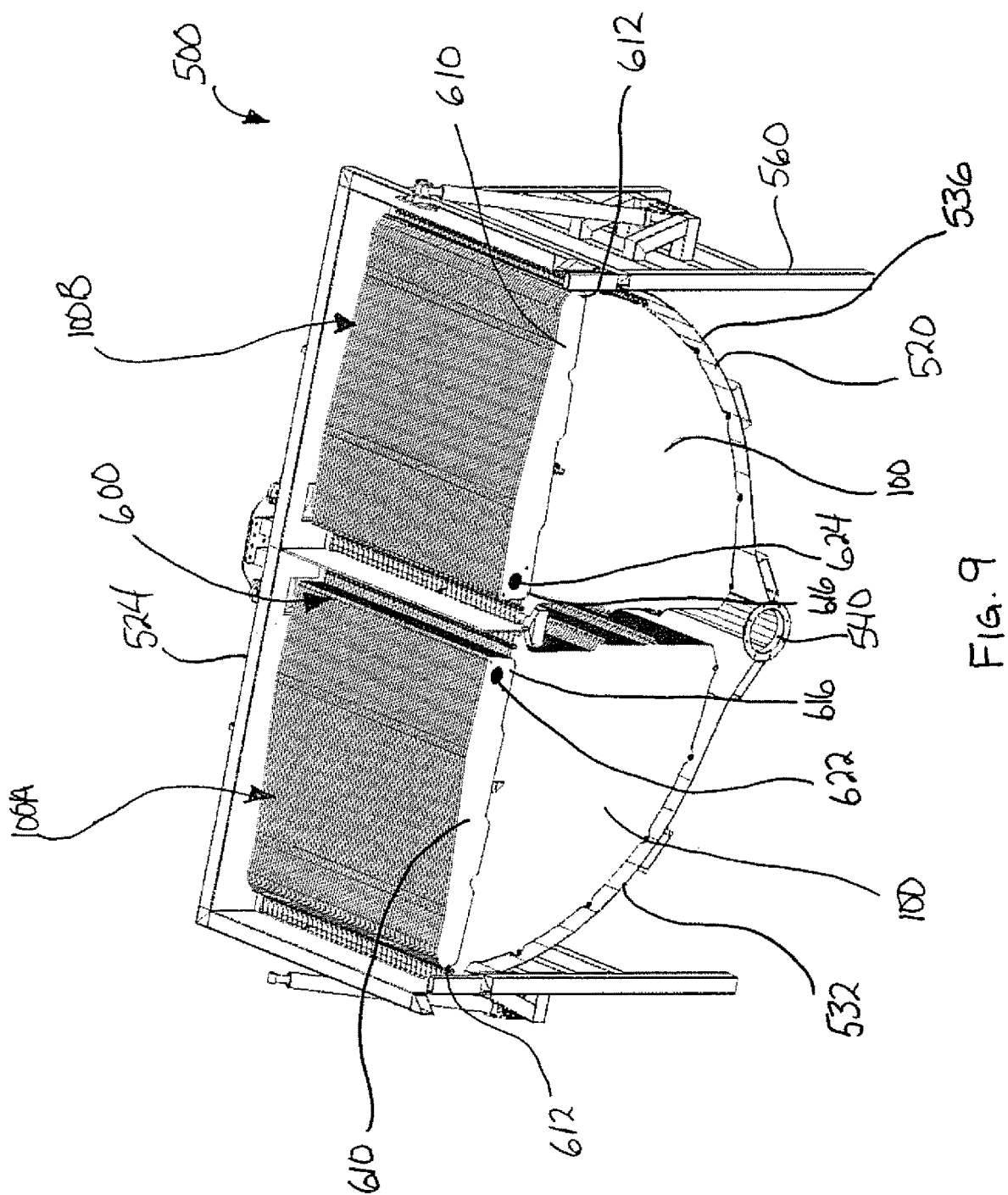
FIG. 9 is a top perspective cut-away view of the electro-separation apparatus shown in FIG. 7.

FIGS. 7-9 illustrate an electro-separation apparatus 500 in a further aspect. The electro-separation apparatus 500. The electro-separation apparatus 500 can include a tank forming a reaction chamber 520. A first set 100A of parallel-spaced electrode plates 100 can be provided running along a first side of the reaction chamber 520 and a second set 100B of parallel-spaced electrode plates 100 can be provided running along a second side of the reaction chamber 520 so that the first set 100A of parallel-spaced electrode plates 100 and the second set 100B of parallel-spaced electrode places 100 run parallel to each other.

The reaction chamber 520 can form a liquid tight enclosure with two end walls 522, 524, a two curved side walls 532, 536. The curved side walls 532, 536 can start at the top of the reaction chamber 520 and curve towards a middle of the reaction chamber 520 as you move down the curved side walls 532, 536 and curve towards a collection trough 540 provided in a bottom of the reaction chamber 520 near or at a middle of the reaction chamber 520. The collection trough 540 can run along a bottom of the reaction chamber 520 between and perpendicular to the ends walls 522, 524 with the curved side walls 532, 536 running parallel to the collection rough 540.

In this manner, solids and sediment that settle out of drilling mud being treated in the reaction chamber 520 can be directed by the curvature of the curved side walls 532, 536 towards the collection trough 540.

The length of the curved side walls 532, 536 can be shorter than the lengths of the end walls 522, 524 so that that the entire reaction chamber 20 has a shortened form.

The first set 100A of electrode plates 100 can extend along and adjacent to the first curved side wall 32 and the second set 100B of electrode plates 100 can extend along and adjacent to the second curved side wall 536.

An auger (not shown) can be provided in the collection trough 540 to move the solids and sediment that collects in the collection trough 540 towards a sediment outlet 552 in the collection trough 540 where the sediment can be removed from the collection trough 540.

A liquid outlet 590 can be provided in the reactor chamber 520 to remove hydrocarbon from near a top of the reactor chamber 520 and liquid that has collected in the reactor chamber 520 after the electro-separation apparatus 500 has separated a batch of drilling fluid. The liquid outlet 590 can be provided in the end wall 524 and positioned above a bottom of the reactor chamber 520 and the sediment outlet 552 so that hydrocarbon and then liquid can be drained from the reactor chamber 520 from points positioned above where the lower layer of solids, sediment and colloids (and some water) will form on the bottom of the reactor chamber 520 before being removed through the sediment outlet 522.

A framework 560 can be provided to support the reaction chamber 520.

The electrode plates 100 can be formed from stainless steel, carbon steel or aluminum. Each of the electrode plates 100 can be a plate as shown in FIG. 3. In one aspect, the electrode plates 100 can have a straight side 102 and an opposite curved side 106 to substantially conform to the curved side wall 532 or the curved side wall 536 of the reaction chamber 520. In one aspect, the electrode plate 100 may be a flat plate. When the electrode plates 100 are positioned in the reactor chamber 520 in the first set of parallel-spaced electrode plates 100 or the second set of parallel-spaced electrode plates 100, the electrode plates 100 can be provided parallel so that each one is parallel to the adjacent electrode plates 100 and oriented vertically in the reaction chamber 520 with a spacing formed between adjacent electrode plates 100. The electrode plates 100 are positioned spaced parallel from one another running along substantially the entire length of the reaction chamber 520 from the first end wall 522 to the second end wall 524 in both the first set of parallel-spaced electrode plates 100 and the second set of parallel-spaced electrode plates 100. The curved side 106 of the electrode plate 100 can be positioned against either the first curved side wall 532 or the second curved side wall 536 depending on if the electrode plate 100 is positioned in the first set 100A of electrode plates 100 or the second set 100B of electrode plates 100. The straight side 102 can be positioned facing inwards of the reaction chamber 520.

A lid 580 can be provided to cover an open top of the reaction chamber 520.

During the processing of the batch of drilling fluid in the electro-separation apparatus 500, synthetic/base oil will segregate from the drilling fluid medium, rise to the surface of the medium and allow for solids and sediment to settle out and sink towards the bottom of the reactor chamber 520 and towards the collection trough 540. Eventually the solids and sediment that have collected in the collection trough 540 where it can be removed from the reaction chamber 520 through the sediment outlet 552 after the hydrocarbons and the liquids are removed through a liquid outlet. However, some of these solids and sediment will attach to the electrode plates 100 and the curving side walls 532, 536 and will require additional means before it can be discharged by way of the collection trough 540.

A wiper assembly 600 can be used that in conjunction with the curved side walls 532, 536 will move solids and sediment that has collected on the curved side walls 532, 536 and the electrode plates 100 in the first set 100A of electrode plates 100 and the second set 1008 of electrode plates 100 towards the collection trough 540.

The wiper assembly 600 can have a number of wiper blades 610 provided between adjacent electrode plates 100 so that the wiper blades 610 can remove solids and sediment that have collected on the surfaces of the electrode plates 100 and the curved side walls 532, 536. A first set of wiper blades 610 can be provided attached to a first axle 622 with the wiper blades 610 passing between electrode plates 100 in the first set 100A of electrode plates 100. A second set of wiper blades 610 can be provided attached to a second axle 624 with the wiper blades 610 in this second set of wiper blades 610 passing between electrode plates 100 in the second set 1008 of electrode plates 100. The first axle 622 can be provided at a radius of curvature of the first curved side wall 532 and the second axle 624 can be provided at a radius of curvature of the second curved side wall 536.

Each wiper blade 610 can have a tip 612 and a proximal end 616. The proximal end 616 of the wiper blade 610 can be attached to either the first axle 622 or the second axle 624 so that the wiper blade 610 extends between adjacent electrode plates 100 to the tip 612 of the wiper blade 610 with the tip 612 of the wiper blade 610 being positioned adjacent either the first curved side wall 532 or the second curved side wall 536. Each wiper blade 610 can have a length that is substantially the length between the curved side wall 532 and the first axle 622 if the wiper blade 610 is provided between electrode plates 100 in the first set of electrode plates 100 or the length between the curved side wall 536 and the second axle 624 if the wiper blade is provided between electrode plates 100 in the second set of electrode plates 100. Each wiper blade 610 can have a width that is substantially the same as the spacing between the adjacent electrode plates 100 the wiper blade 610 is positioned between.

One or more hydraulic cylinders 630 can be used to rotate the first axle 622 and thereby rotate the wiper blades 610 attached to the first axle 622 and positioned between electrode plates 100 in the first set 100A of electrode plates 100 around the first axle 622. As these wiper blades 610 are rotated by the first axle 622 around their proximal ends 616, the wiper blades 610 will rotate downwards between the electrode plates 100 in the first set 100A of electrode plates 100 and the tips 612 of the wiper blades 610 will move down adjacent to the inside surface of the first curving side walls 532.

In a similar manner, one or more hydraulic cylinders 632 can be used to rotate the second axle 624 and thereby rotate the wiper blades 610 attached to the second axle 624 and positioned between electrode plates 100 in the second set 1008 of electrode plates 100 around the second axle 624. As these wiper blades 610 are rotated by the second axle 624 around their proximal ends 616, the wiper blades 610 will rotate downwards between the electrode plates 100 in the second set 100B of electrode plates 100 and the tips 612 of the wiper blades 610 will move down adjacent to the inside surface of the second curving side walls 534.

Figure 10:
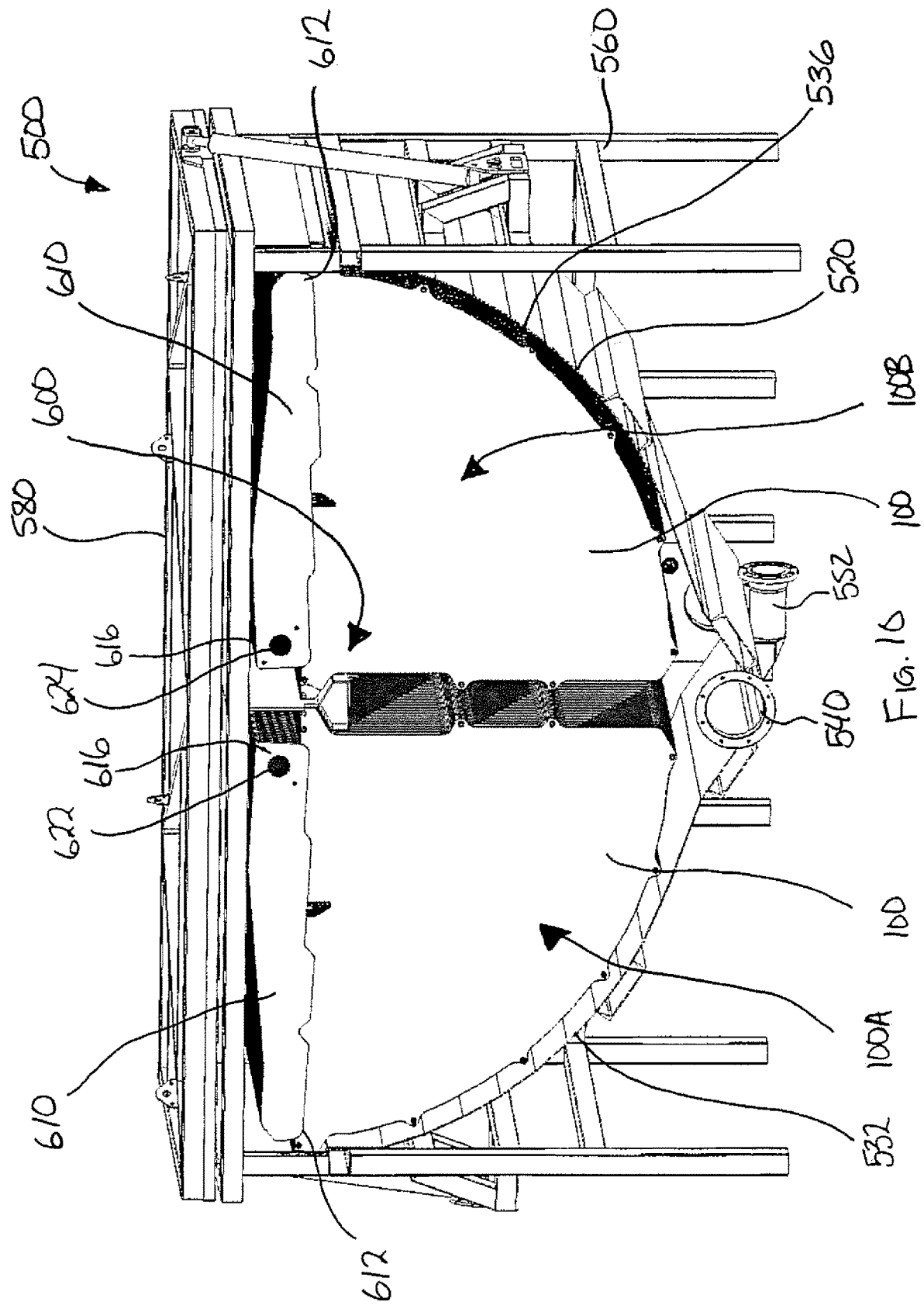
FIG. 10 is a cut-away schematic view of the electro-separation apparatus of FIG. 7 with a wiper assembly in a starting position.

FIG. 10 illustrates the wiper assembly in a starting position with the wiper blades 610 positioned above or near a top of the electrode plates 100 in the first set 100A of electrode plates 100 and the second set 100B of electrode plates 100 and the wiper blades 610 positioned substantially horizontally. The tips 612 of the wiper blades can be positioned at or above the top ends of the curving side walls 532, 536. The shape of the reaction chamber 520 lends itself to effectively sweep the solids and sediment using the sweeping assembly 600 to the lowest point of the reaction chamber 520, which will be the collection trough 540 provided running along the bottom and middle of the reaction chamber 520. With the solids and sediment collected in the collection trough 540, the solids and sediment can be removed from the reaction chamber 520 after the treatment of the drilling fluid has been completed.

In operation, the first axle 622 and the second axle 624 are rotated which causes the wiper blades 610 between both the first set 100A and the second set 1008 of electrode plates 100 to rotate around their proximal ends 216 causing the wiper blades 210 to sweep downwards between the electrode plates 100 with the edges of the wiper blades 610 removing sediment that has built upon the electrode plates 100 and the tips 612 of the wiper blades 610 scraping off sediment from the inside surface of the curving side walls 532, 536.

The wiper blades 610 between the first set 100A of electrodes 100 can be operated in unison with the wiper blades 610 between the second set 100B of electrodes 100 or independently, such as by alternating the sweeping of the first set 100A of electrode plates 100 and then the second set 1008 of electrode plates 100 or vice versa.

Figure 11:
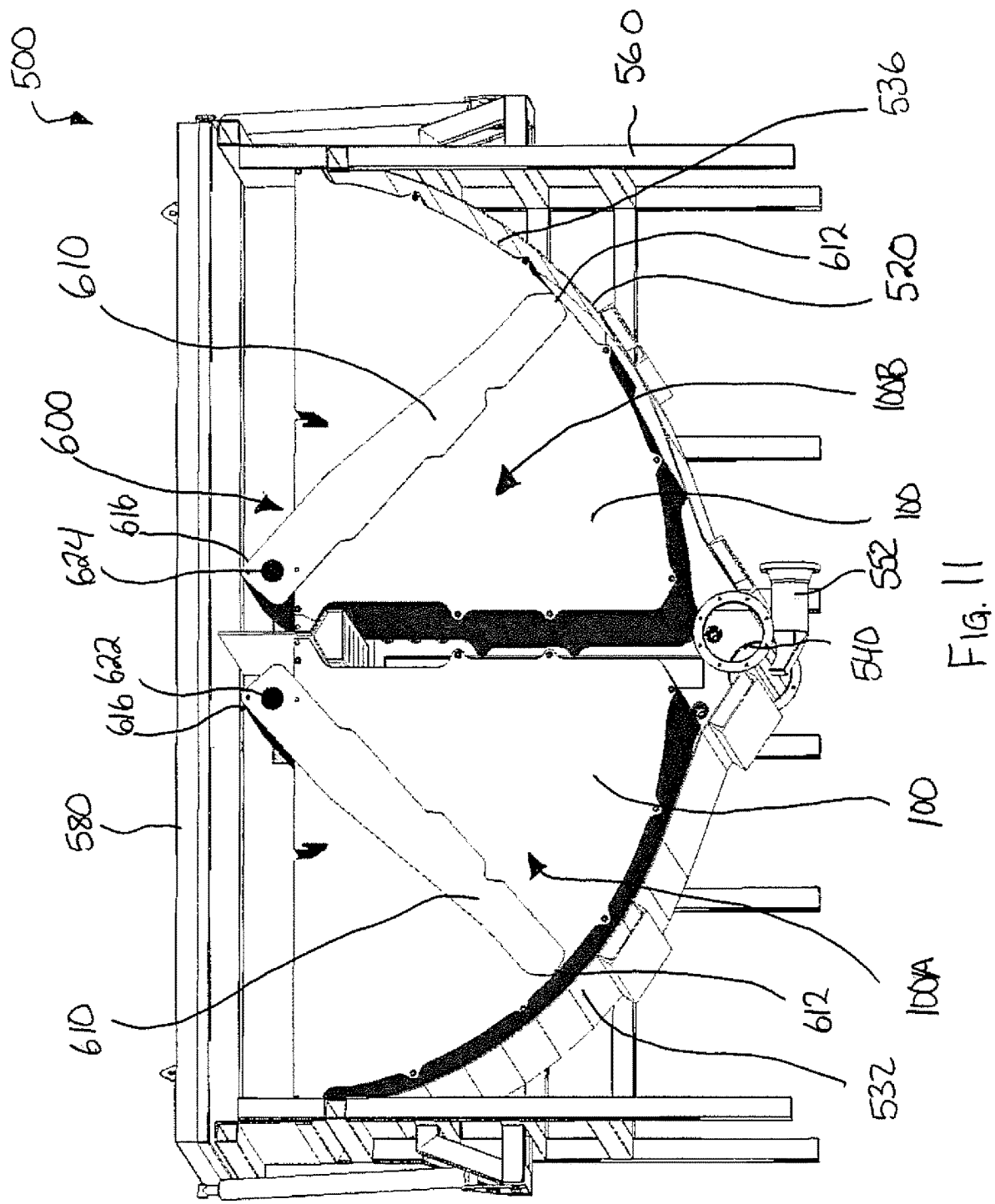
FIG. 11 is a cut-away schematic view of the electro-separation apparatus of FIG. 7 with a wiper assembly in operation.

FIG. 11 shows the wiper blades 610 as they are sweeping downwards. The wiper blades 610 between the first set 100A of electrode plates 100 and the wiper blades 610 between the second set 100B of electrode plates 100 will rotate towards each other until they reach a second position or finished position, as shown in FIG. 12, with the wiper blades 610 between the first set of electrode plates 100 and the wiper blades 610 between the second set of electrode plates 100 being positioned vertically and substantially parallel to one another. The collection trough 540 can be provided directly below the spacing formed between the parallel positioned wiper blades 610.

In operation, a batch of drilling fluid can be introduced into the reaction chamber 520 when the wiper assembly 600 is in the starting position shown in FIG. 10 so that the drilling fluid fills the reaction chamber 520 between the electrode plates 100. An electric field can then be generated between the electrode plates 100 to subject the batch of drilling fluid in the reaction chamber 520 to an electro-separation stage. A DC voltage can be applied across the electrode plates 100 to create an electric field between the electrode plates 100 that passes through the batch of drilling fluid in the reaction chamber 520. As the electric field continues to be passed through the drilling fluid, hydrocarbon from the drilling fluid will rise to the surface of the drilling fluid medium and solids and sediment will settle out towards the bottom of the reaction chamber 520, some of which will adhere to the surfaces of the electrode plates 100 and collect on the curving side walls 532, 534.

After some time has passed, the wiper assembly 600 can be used to remove sediment from the surfaces of the electrode plates 100 and the inner surface of the curving side walls 532, 536 that has been deposited there during the electro-separation stage. The wiper assembly 600 can be moved from its first position to its second position to scrape and sweep solids and sediment that have collected on the electrode plates 100 and the curving side walls 532, 536 towards the collection trough 540.

The sweeping motion of the wiper blades 610 downwards between the starting position shown in FIG. 10 to the finishing position shown in FIG. 12 can scrape off solids and sediment that have accumulated on the surfaces of the electrode plates 100 and the curved side walls 532, 536 and move the solids and sediment downwards along the curved side walls 532, 536 towards the collection trough 540. After the wiper assembly 600 has swept the wiper blades 610 to the finishing position, the wiper blades 610 can be rotated back up to the starting position shown in FIG. 10 to be used again to aid in removing sediment from the reactor chamber 520.

After the hydrocarbon and other liquids have been removed from the reaction chamber 520, the sediment (and colloids and water) in the collection trough 540 can be removed through the sediment outlet 552 to allow a new batch of drilling fluid to be loaded into the reaction chamber 520 for treatment.

After the hydrocarbon and other liquids have been removed from the reaction chamber 520 out of the liquid outlet 590, the sediment (and colloids and water) in the collection trough 540 can be removed through the sediment outlet 552 to allow a new batch of drilling fluid to be loaded into the reaction chamber 520 for treatment.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An electro-separation apparatus for separation of drilling fluids, the apparatus comprising:
   a reaction chamber operative to hold a drilling fluid;
   a set of parallel-spaced electrode plates provided in the reaction chamber;
   a sediment outlet positioned proximate a bottom of the reaction chamber to remove sediment from the reaction chamber;
   a plurality of wiper blades, each wiper blade positioned between a pair of adjacent electrode plates from the set of parallel-spaced electrode plates and moveable to sweep from a starting position to a finished position to remove the sediment from the pair of adjacent electrode plates and move the sediment towards the sediment outlet; and
   a power supply connected to the set of parallel-spaced electrode plates to create an electric field between the set of parallel-spaced electrode plates,
   wherein the reaction chamber has a curved side wall and a straight side wall opposite the curved side wall,
   wherein the curved side wall has a portion with a substantially constant radius of curvature,
   wherein each wiper blade from the plurality of wiper blades is rotatable around an axis,
   and wherein the axis is positioned at a radius of curvature of the curved side wall, at a center of curvature of the curved side wall.

2. The electro-separation apparatus of claim 1, wherein each electrode plate from the set of parallel-spaced electrode plates has a curved side that substantially conforms to the curved side wall of the reaction chamber and a straight side opposite the curved side that substantially conforms to the straight side wall of the reaction chamber.

3. The electro-separation apparatus of claim 2, wherein the plurality of wiper blades are positioned substantially vertically and proximate the straight sides of the set of parallel-spaced electrode plates in the second position.

4. The electro-separation apparatus of claim 1, wherein each wiper blade from the plurality of wiper blades is moveable from the starting position to the finished position by the wiper blade being rotatable around the axis in a first direction and moveable back from the finished position to the starting position by the wiper blade being rotatable in a second direction, opposite to the first direction.

5. The electro-separation apparatus of claim 4, wherein each wiper blade from the plurality of wiper blades has a tip and a proximal end, the proximal end connected to an axle defining the axis, and wherein a length of the wiper blade from the axis defined by the axle attached to the wiper blade and the tip of the wiper blade is less than a radius of curvature of the curved side wall along a portion of the curved side wall to form a gap between the tip and the curved side wall.

6. The electro-separation apparatus of claim 5, wherein the tips of the wiper blades maintain a constant distance from the curved side wall along the portion of the curved side wall as the wiper blades move from the first position to the second position.

7. The electro-separation apparatus of claim 6, wherein the portion of the curved side wall extends from a top end of the curved side wall to proximate a bottom end of the curved side wall.

8. The electro-separation apparatus of claim 1, further comprising a liquid outlet provided in the reaction chamber positioned above a bottom of the reaction chamber and the sediment outlet for removing liquid from the reaction chamber.

9. The electro-separation apparatus of claim 1, wherein each wiper blade from the plurality of wiper blades has a width substantially the same as a spacing between the pair of adjacent electrode plates from the set of parallel-spaced electrode plates.

10. The electro-separation apparatus of claim 1, wherein the plurality of wiper blades is positioned substantially horizontal in the starting position and above the drilling fluid in the reaction chamber.

11. The electro-separation apparatus of claim 1, wherein the set of electrode plates extends from a first end of the reaction chamber to a second end of the reaction chamber.

12. The electro-separation apparatus of claim 1, wherein each electrode plate from the set of parallel-spaced electrode plates is oriented substantially vertically in the reaction chamber.

13. The electro-separation apparatus of claim 1, further comprising a collection trough provided proximate a bottom end of the curved side wall and the sediment outlet is provided in the collection trough.

14. The electro-separation apparatus of claim 13, wherein the collection trough runs substantially parallel to the curved side wall.

15. The electro-separation apparatus of claim 14, wherein an auger is provided in the collection trough to direct sediment to the sediment outlet.

16. The electro-separation apparatus of claim 1, wherein a lid is provided for covering the reaction chamber.

17. The electro-separation apparatus of claim 1, wherein a tip of each wiper blade from the plurality of wiper blades moves along and adjacent to an inner surface of the curved wall as the plurality of wiper blades are moved from the starting position to the finished position.

\* \* \* \* \*

UNITED STATES PATENT AND TRADEMARK OFFICE
CERTIFICATE OF CORRECTION

PATENT NO. : 11,639,640 B2
APPLICATION NO. : 16/814266
DATED : May 2, 2023
INVENTOR(S) : Sean Frisky et al.

It is certified that error appears in the above-identified patent and that said Letters Patent is hereby corrected as shown below:

On the Title Page

Item (73), assignee, please delete "Effect" and insert -- Effects --.

In the Specification

In Column 9, Line 54, please delete "1008 of parallel-spaced electrode places" and insert -- 100B of parallel-spaced electrode plates --.
In Column 10, Line 10, please delete "1008" and insert -- 100B --.
In Column 11, Line 11, please delete "1008" and insert -- 100B --.
In Column 11, Line 24, please delete "1008" and insert -- 100B --.
In Column 11, Line 61, please delete "1008" and insert -- 100B --.
In Column 12, Line 19, please delete "1008" and insert -- 100B --.
In Column 12, Line 31, please delete "1008" and insert -- 100B --.

Signed and Sealed this
Thirteenth Day of June, 2023

Katherine Kelly Vidal
*Director of the United States Patent and Trademark Office*